United States Patent
Valls, Jr.

(10) Patent No.: US 7,140,618 B2
(45) Date of Patent: Nov. 28, 2006

(54) SOCKET WITH DUAL-FUNCTIONAL COMPOSITE GASKET

(75) Inventor: Jose E. Valls, Jr., Ponce, PR (US)

(73) Assignee: Vassallo Research & Development Corporation, Coto Laurel, PR (US)

( * ) Notice: Subject to any disclaimer, the term of this patent is extended or adjusted under 35 U.S.C. 154(b) by 0 days.

(21) Appl. No.: 10/345,216

(22) Filed: Jan. 16, 2003

(65) Prior Publication Data

US 2004/0140625 A1    Jul. 22, 2004

(51) Int. Cl.
*F16L 17/06* (2006.01)

(52) U.S. Cl. .............. 277/609; 277/603; 277/608; 277/616; 277/625; 285/110

(58) Field of Classification Search ........ 277/603–604, 277/606, 608–609, 611, 616–617, 625–627, 277/602, 619; 285/374, 379, 104, 105, 109–110
See application file for complete search history.

(56) References Cited

U.S. PATENT DOCUMENTS

| | | | | |
|---|---|---|---|---|
| 2,966,539 A | * | 12/1960 | Sears et al. ............... | 277/625 |
| 3,260,540 A | * | 7/1966 | Houot ...................... | 277/625 |
| 3,372,942 A | * | 3/1968 | Carter ...................... | 277/616 |
| 3,573,871 A | | 4/1971 | Warner .................... | 277/168 |
| 3,776,682 A | | 12/1973 | Parmann .................. | 425/384 |
| 3,929,958 A | | 12/1975 | Parmann .................. | 264/249 |
| 4,030,872 A | | 6/1977 | Parmann .................. | 425/393 |
| 4,066,269 A | | 1/1978 | Linne ....................... | 277/228 |
| 4,120,521 A | | 10/1978 | Parmann .................. | 285/113 |
| 4,299,412 A | | 11/1981 | Parmann .................. | 285/110 |
| 4,343,480 A | | 8/1982 | Vassallo .................. | 277/207 A |
| 4,368,894 A | | 1/1983 | Parmann .................. | 277/166 |
| 4,372,905 A | | 2/1983 | Bohman ................... | 264/249 |
| 4,379,559 A | | 4/1983 | Bohman ................... | 277/207 A |
| 4,468,042 A | * | 8/1984 | Pippert et al. ............ | 277/638 |
| 4,572,523 A | | 2/1986 | Guettouche et al. ...... | 277/207 |
| 4,579,354 A | | 4/1986 | Vassallo et al. .......... | 277/207 A |
| 4,602,793 A | | 7/1986 | Andrick ................... | 277/207 |
| 4,625,383 A | | 12/1986 | Vassallo et al. .......... | 29/445 |
| 4,637,618 A | | 1/1987 | Valls ........................ | 277/152 |
| 4,666,165 A | | 5/1987 | Nordin .................... | 277/207 A |

(Continued)

FOREIGN PATENT DOCUMENTS

JP    56127416 A  * 10/1981

OTHER PUBLICATIONS

Brochure entitled "Anger-Lock F576", Forsheda, Printed in Sweden, Reklamfolket AB/Hyli-Tryck AB 98 Oct. 2000 ex.

(Continued)

*Primary Examiner*—Brian E. Glessner
*Assistant Examiner*—Christopher J. Boswell
(74) *Attorney, Agent, or Firm*—Roylance, Abrams, Berdo & Goodman, L.L.P.

(57) ABSTRACT

A gasketed pipe joint including a dual-functional, composite gasket, which in addition to forming a seal between a pipe bell and a spigot provides a molding surface for forming a bent retainer in the hub of the pipe or fitting. The dual-functional composite gasket comprises a first axially disposed portion formed of a non-elastomeric, substantially rigid, substantially non-resilient plastic material and has a first leading edge and a first trailing edge, and a second axially disposed portion, adjacent the first axially disposed portion, formed of an elastomeric material. Preferably, the gasket comprises a major portion of the non-elastomeric, substantially rigid, substantially non-resilient plastic and a minor portion of the elastomeric material.

54 Claims, 4 Drawing Sheets

U.S. PATENT DOCUMENTS

| | | | |
|---|---|---|---|
| 4,693,483 A | 9/1987 | Valls | 277/207 A |
| 4,723,905 A | 2/1988 | Vassallo et al. | 425/392 |
| 4,818,209 A | 4/1989 | Petersson et al. | 425/392 |
| 4,826,028 A | 5/1989 | Vassallo et al. | 277/207 A |
| 4,834,398 A | 5/1989 | Guzowski et al. | 277/207 |
| 4,834,430 A | 5/1989 | Vassallo et al. | 285/379 |
| 4,856,561 A | 8/1989 | Zicaro | 138/109 |
| 4,906,010 A * | 3/1990 | Pickering et al. | 277/625 |
| 4,984,831 A | 1/1991 | Bengtsson | 285/379 |
| 5,057,263 A | 10/1991 | Bengtsson | 264/249 |
| 5,064,207 A | 11/1991 | Bengtsson | 277/207 A |
| D323,024 S | 1/1992 | Petersson et al. | D23/269 |
| 5,094,467 A * | 3/1992 | Lagabe | 277/616 |
| D326,710 S | 6/1992 | Valls | D23/269 |
| 5,120,153 A | 6/1992 | Valls | 403/305 |
| D330,073 S | 10/1992 | Valls | D23/269 |
| 5,213,339 A | 5/1993 | Walworth | 277/1 |
| 5,219,189 A | 6/1993 | Demoisson et al. | 285/105 |
| 5,295,697 A | 3/1994 | Weber et al. | 277/181 |
| D347,885 S | 6/1994 | Gustafsson | D23/269 |
| D351,459 S | 10/1994 | Andersson | D23/269 |
| D362,902 S | 10/1995 | Reiber | D23/269 |
| D374,710 S | 10/1996 | Gustafsson | D23/269 |
| 5,639,959 A | 6/1997 | Reiber | 73/86 |
| 5,649,713 A | 7/1997 | Ledgerwood | 277/209 |
| 5,695,201 A | 12/1997 | Wheeler | 277/205 |
| 5,803,513 A * | 9/1998 | Richardson | 285/342 |
| 6,142,484 A | 11/2000 | Valls, Jr. | 277/602 |
| 6,173,965 B1 * | 1/2001 | Niessen | 277/584 |
| 6,260,851 B1 * | 7/2001 | Baron | 277/603 |
| 6,277,315 B1 * | 8/2001 | Hallstedt et al. | 264/250 |
| 6,371,530 B1 * | 4/2002 | Sato et al. | 277/604 |
| 6,409,178 B1 * | 6/2002 | Raden et al. | 277/592 |
| 6,457,718 B1 * | 10/2002 | Quesada | 277/604 |
| 6,499,744 B1 * | 12/2002 | Quesada | 277/609 |

OTHER PUBLICATIONS

Brochure entitled "Power-Lock F601", Forsheda Pipe Seal Division.

Tyton Gaskets, DN100-DN750, copyright by Tyco International Ltd., May 2004.

* cited by examiner

SOCKET WITH DUAL-FUNCTIONAL COMPOSITE GASKET

FIELD OF THE INVENTION

The present invention relates to a fitting or pipe socket containing a dual-functional composite gasket comprising an elastomeric portion and a non-elastomeric portion for providing a securely seated gasket in the fitting so that an improved seal results between the gasketed socket and a spigot, the method of forming the fitting containing the securely sealed gasket, and the composite gasket, per se. Additionally, the present invention relates to an improved pipe joining system including the composite gasket.

BACKGROUND OF THE INVENTION

In plastic pipe systems, connections between the various components must be sealed to prevent escape of fluids from the connections. The connections typically comprise an enlarged bell which receives a spigot. The spigot and bell can be formed as segments of pipe lengths or connecting members, such as elbows, T's, etc. In this application, the terms "fitting" and "pipe" are intended to include both pipe lengths and connecting members.

The seal between the bell and spigot is conventionally provided by a gasket mounted in one of the components of the connection and sealingly and resiliently engaging the other component. Most often, the seal is mounted in the bell and is engaged and deformed by the spigot such that a tight interference fit is formed to prevent the escape of fluid.

Gaskets formed exclusively of elastomeric material, such as natural rubber, are disadvantageous since they can be displaced from their intended position so as not to provide an adequate seal. For example, such gaskets may be pushed from their intended position during insertion of the spigot within the bell, which is know as "fishmouthing".

Gaskets reinforced with metal bands can be deformed and the metal can corrode causing the gaskets to leak. Moreover, when such gaskets are made an integral segment of the pipe spigot, deformation or corrosion of the metal band can cause the entire pipe section to leak.

Gaskets reinforced with plastic locking rings have been increasingly used. Such gaskets are described in U.S. Pat. No. 4,343,480 to Vassallo and U.S. Pat. No. 4,579,354 to Vassallo and Valls, which are hereby incorporated by reference in their entirety. Although such systems have the advantage of reducing the amount of elastomeric material required to prevent tearing of the gasket upon making up of the joint and to discourage blow out at operating pressures, a gap normally results between the forward wall of the elastomeric gasket and the internal surface of the bent retaining wall of the hub of the pipe or fitting. Thus, the final dimensions of the bent retaining wall depends entirely on the steel bending die, which results in non-uniform retainer walls.

SUMMARY OF THE INVENTION

It has now been discovered that the disadvantages associated with the use of conventional elastomeric gaskets used in combination with a retaining ring can be eliminated by the present invention. Surprisingly, it has been found that the gap between the inner wall of a bent retainer and the adjacent wall of the gasket in the resulting groove that existed in prior configurations can be eliminated by the present invention comprising a gasketed bell in the cylindrical body of a pipe or fitting, the pipe or fitting having a longitudinal axis and comprising an enlarged, generally cylindrical, one piece hub formed in the forward end of the body, with the hub having a cylindrical section of a first diameter suitable to overfit an end of an adjacent length of pipe, the hub including an integral, radially inwardly open internal groove of a second diameter, the second diameter being greater than said first diameter. The internal groove is defined forwardly by an integral, radially inwardly bent retainer and rearwardly by an integral, circular, generally angular corner with a, generally cylindrical, composite gasket disposed in the groove.

The dual-functional, composite gasket of the present invention comprises forward and rearward axially disposed portions, in which the forward, axially disposed portion is formed of a non-elastomeric plastic and is substantially non-flexible in the axial direction, and has a first leading edge and a first trailing edge. Unlike gasketed fittings having a bent retainer which are formed with elastomeric gaskets used with a plastic reinforcing ring, the first leading edge of the forward axially disposed portion of the composite gasket of the present invention is in substantial contact with the inner surface of said radially inwardly bent retainer. The rearward axially disposed portion is formed of an elastomeric material and is adjacent and in contact with the forward axially disposed non-elastomeric portion, such that the rearward axially disposed portion has a second leading edge and a second trailing edge, with the second leading edge of the second axially disposed portion in contact with said first trailing edge of said forward axially disposed portion and the second trailing edge having a rounded corner seated in the integral, circular, angular corner of the internal groove. The bent retainer and the hub are of unitary construction.

According to a preferred embodiment of the present invention, the forward portion of the composite gasket, which comprises the non-elastomeric plastic, forms the major portion of the composite gasket, while the rearward, elastomeric portion of the composite gasket, comprises the minor portion of the gasket. Thus, by positioning substantially the non-flexible, non-elastomeric plastic as the forward portion of the gasket and as the major portion of the gasket, it better serves as a mold for forming the bent retainer, which both eliminates the gap between the undersurface of the bent retainer and the surface of the gasket and provides a precise and consistent retainer configuration. Thus, the present gasket serves the dual function of a firm molding surface and a fluid seal.

According to another preferred embodiment, a portion of the first trailing edge of the forward portion of the composite gasket extends into the rearward portion of the composite gasket in various geometric configurations, which not only improve the joining of the forward and rear portions of the gasket, but reduce the cost of the gasket because of the lower cost of non-elastomeric plastic as compared with the elastomeric portion of the gasket.

The present invention also comprises a method for seating a composite gasket in the cylindrical body of a pipe or fitting, the pipe or fitting having a longitudinal axis, which comprises providing an enlarged, generally cylindrical, one piece hub formed in the forward end of the body, the hub having a cylindrical section of a first diameter suitable to overfit an end of an adjacent length of pipe, the hub including an integral, radially inward open, internal groove of a second diameter, in which the second diameter is greater than the first diameter, the internal groove is defined rearwardly by an integral, circular, angular corner. Next, a generally cylindrical, dual-functional, composite gasket is inserted into the groove, which gasket comprises forward and rearward axially disposed portions, in which the forward, axially disposed portion is formed of a non-elastomeric plastic and is substantially non-flexible in the axial direction, and has a first leading edge and a first trailing edge, while the rearward axially disposed portion is formed of an elastomeric material, the rearward axially disposed portion has a second leading edge and a second trailing edge. The second leading edge of the second axially disposed portion is in contact with the first trailing edge of the forward axially disposed portion, and the second trailing edge has a substantially rounded corner. The gasket is inserted into the groove such that the rounded corner of the gasket is seated in the integral, circular, angular corner of said groove. Next, the end of the first diameter section of the hub is heated to cause the end to soften; and the softened end of the first diameter section of the hub is bent to cause it to move radially inward until the inner surface of the hub end is in contact with and firmly pressed against the first leading edge of the non-elastomeric plastic forward portion of the composite gasket to form an integral, radially inwardly bent retainer.

The present invention further comprises a pipe joint formed by inserting the insert end of a first plastic pipe into the gasketed bell in the cylindrical body of a pipe or fitting having a longitudinal axis and comprising an enlarged, generally cylindrical, one piece hub formed in the forward end of the body having a cylindrical section of a first diameter suitable to overfit the insert end of the first pipe. The hub includes an integral, radially inward open, internal groove of a second diameter greater than the first diameter, and the internal groove is defined forwardly by an integral, radially inward bent retainer and rearwardly by an integral, circular, generally angular corner. The internal groove has a generally cylindrical, dual-functional, composite gasket disposed therein comprising forward and rearward axially disposed portions. The forward, axially disposed portion is formed of a non-elastomeric plastic and is substantially non-flexible in the axial direction, and has a first leading edge and a first trailing edge with the first leading edge of the forward axially disposed portion in substantial contact with the inner surface of the radially inwardly bent retainer. The rearward axially disposed portion is formed of an elastomeric material and is adjacent and in contact with the forward axially disposed portion, and has a second leading edge and a second trailing edge. The second leading edge of the second axially disposed portion is in contact with the first trailing edge of the forward axially disposed portion, and the second trailing edge has a substantially rounded corner seated in the integral, circular, angular corner. The bent retainer and the hub are of unitary construction.

BRIEF DESCRIPTION OF THE DRAWINGS

Referring now to the drawings that form a part of the original disclosure.

DETAILED DESCRIPTION OF PREFERRED EMBODIMENTS

Figure 1:
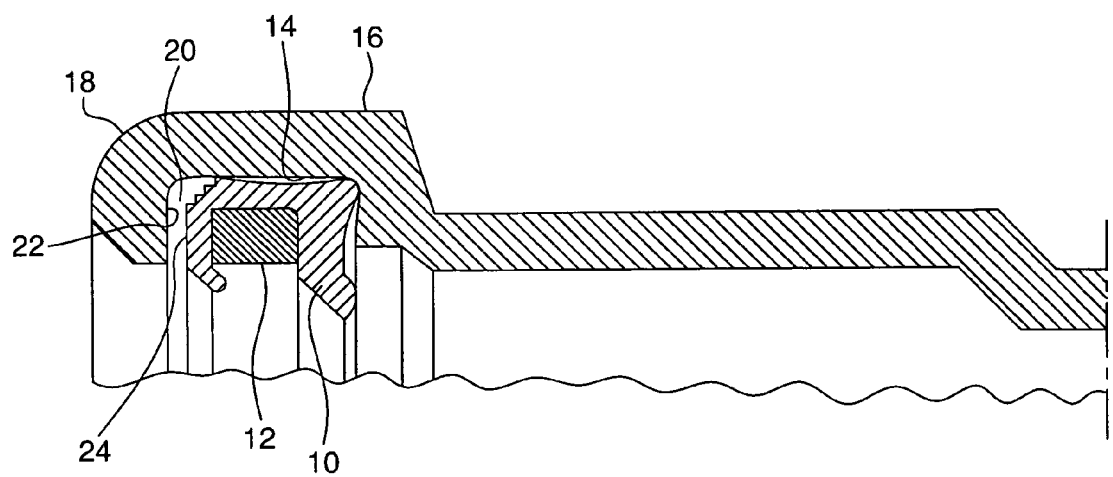
FIG. 1 is an elevational view in partial cross-section of a pipe fitting with a prior art gasket.

Although specific terms are used in the following description for the sake of clarity, these terms are intended to refer to only the particular structure of the invention selected for illustration in the drawings, and are not intended to define or limit the scope of the invention.

Referring now to the drawings, FIG. 1 depicts an elastomeric gasket 10, formed, for example of rubber, with a plastic retaining ring 12 formed, for example of polypropylene, disposed in the circular groove 14 of the hub 16 or belled end of a plastic pipe or fitting. Hub 16 has a bent retainer 18, which as formed by heating the end of the pipe or fitting and bending the end of the pipe with a steel bending die (not shown). As seen in FIG. 1, use of such die results in a gap 20 between the inner wall 22 of the bent retainer and the adjacent edge 24 of the elastomeric ring 10. Thus, the final position and dimensions of the bent retaining wall 18 depends entirely on the steel bending die, which results in non-uniform retainer walls and a gap between the inside of the bent retainer wall and the adjacent edge of the elastomeric gasket.

Figure 2:
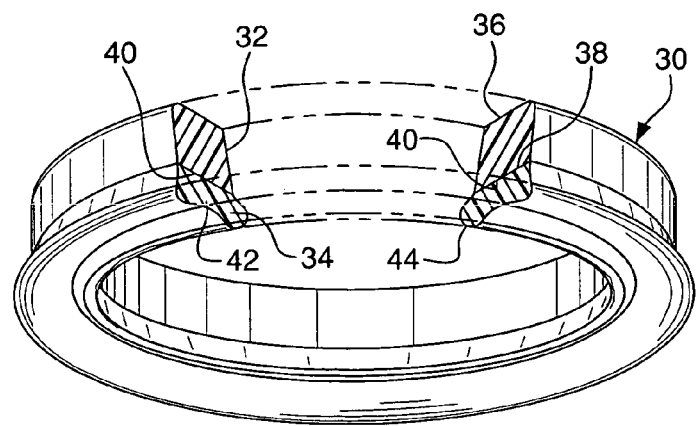
FIG. 2 is a perspective view with partial cross-section of a gasket according to a first embodiment of the present invention.

As shown in FIG. 2, the composite gasket 30 of the present invention comprises a forward axially disposed continuous, circular non-elastomeric plastic portion 32 and a rearward axially disposed continuous, circular elastomeric portion 34, in which the forward, axially disposed portion 32 is formed of a non-elastomeric plastic and is substantially non-flexible in the axial direction, and has a first leading edge 36 and a first trailing edge 38. It is preferred that the composite gasket 30 is continuous in cross-section.

As indicated, non-elastomeric plastic portion 32 is substantially non-flexible in the axial direction. This rigidity enables the non-elastomeric portion 32 of composite gasket to serve as a molding surface for formation of the bent retainer as will be described in connection with FIGS. 3 and 4. The non-elastomeric portion 32 may also be substantially non-flexible in the radial direction as well, if desired. However, in the event the elastomeric portion 34 of composite gasket 30, which is the sealing part of gasket 30, becomes damaged, for example, by a small rock or other sharp object, it is desirable to be able to replace the entire gasket 30. Thus, while non-elastomeric portion 32 is substantially non-flexible in the axial direction, it may be substantially flexible in the radial direction to enable it to be bent, for example, in a heart-shaped configuration for removal from the groove in which it is seated and replaced by a fresh gasket 30, which can be bent without breaking in a heart-shaped configuration for insertion into the groove in the manner illustrated in FIG. 4 of U.S. Pat. No. 4,693,483 to Valls, the entire disclosure of which is incorporated herein by reference. In addition, to use in the formation of bent retainers in fittings or pipe bells in accordance with the present invention, such gaskets 30 may be used in fittings pipe sockets that are made, for example, by blow molding or formed by collapsible mandrels and a preformed rectangular cross-section, including the retainer and groove, such that the groove is formed forwardly by an integral, radially inwardly extending retainer, and rearwardly by an integral, circular, generally angular corner. In such event, gasket 30 can be bent into a heart-shape and installed in the groove of such preformed bell.

In addition, non-elastomeric portion 32 may be substantially non-flexible in the radial as well as the axial direction, if desired. However, the resulting composite gasket 30 cannot be bent into a heart shape without breaking, and thus, cannot be removed from the fitting or pipe bell for replacement.

The non-elastomeric portion 32 may be formed of any suitable plastic and may include polyolefins, such as polyethylene or polypropylene and copolymers thereof, poly (vinylchloride), and the like materials which are usually synthetic, thermoplastic polymers and capable of being processed by extrusion, molding, etc., but which are not capable of rapidly returning to the original length after being significantly stretched. Such materials are well-known in the art. Suitable plastics useful for the non-elastomeric plastic portion and the elastomeric portion 32 are disclosed in U.S. Pat. No. 4,693,483 to Valls and in U.S. Pat. No. 4,723,905 to Vassallo and Valls, the entire disclosures of which are hereby incorporated by reference.

Referring again to FIG. 2, the rearward axially disposed elastomeric portion 34 has a leading edge 40 that is adjacent and in contact with the trailing edge 38 of the forward axially disposed non-elastomeric portion 32. The rearward axially disposed portion 34 also has a trailing edge 42 and is also is provided with a sealing lip 44 extending radially inwardly. As seen in FIG. 2, the entire exposed trailing edge 42 or trailing portion of rearward portion 34 is formed of an elastomeric, resilient material. Typically, the elastomeric portion 34 is formed of a thermoplastic elastomeric, resilient polymeric, material, such as a synthetic rubber, including styrene-butadiene copolymer, neoprene, butyl rubber, nitrile rubber, silicone rubber and the like, a blend of natural and synthetic rubbers, but preferably, a thermoplastic elastomer which will comply with specifications for elastomeric gaskets for joining plastic pipe, such as those, for example, provided by ASTM standard specifications, such as ASTM Specification F477-96a, published July 1999. An especially suitable thermoplastic elastomer is, for example, commercially available under the name "Santoprene" commercially available from Advanced Elastomer Systems L.P.. Also, "Thermolast K" compound TC 6 C AA commercially available from Gummiverk Kraiburg Elastik GmbH is suitable. Of course, portion 34 may contain or comprise natural rubber. Non-elastomeric portion 32 can be adhered or preferably fused to the elastomeric portion 34 in a single molding step in which the non-elastomeric portion 32 and elastomeric portion 34 are co-molded, for example.

Another advantage of the present invention is that the elastomeric portion 34 can be color coded to easily identify the composite gasket by color. Thus, for example, "Santoprene grade 201-55W185" can be color coded for a given application user application to identify the composite gasket on sight.

Likewise, the non-elastomeric portion 32 may be color coded so as, for example, to match the color of the fitting or belled pipe in which it is used, which fitting or belled pipe which has been tinted to a white or non-white color. Thus, for example, portion 32 may be colored green to match the green fitting with which it is used. Thus, portion 32 may be colored red, green, yellow, blue, brown or white, or hue of such color or any other desired color to match or contrast the pipe or fitting with which it is to be used. Similarly, elastomeric portion 34 may be colored with such colors to match or be in contrast with the color of portion 32. Thus, portion 34 could be tinted green and portion 32 black or green to contrast or match, respectively, portion 34. Such color coding may be accomplished by adding the desired tint to the non-elastomeric and/or elastomeric material prior to co-molding the composite gasket. Such color coding may be for aesthetic purposes or for identification purposes. For example, elastomeric portion 34 may be tinted various selected colors to identify the hardness of portion 34 to the end user.

As seen in FIG. 2, the composite gasket 30 of the present invention preferably comprises a major portion of the non-elastomeric plastic portion 32 and a minor portion of the elastomeric portion 34. Suitable amounts of the non-elastomeric plastic portion of the gasket include, for example, from about 50 or 51 percent by volume to about 80 percent by volume of the composite gasket, preferably from about 52 percent to about 70 percent by volume of the volume of the composite gasket, with the remainder being the elastomeric component of the gasket. An especially preferred composite gasket contains about 60% by volume non-elastomeric plastic and about 40% by volume elastomer.

Figure 3:
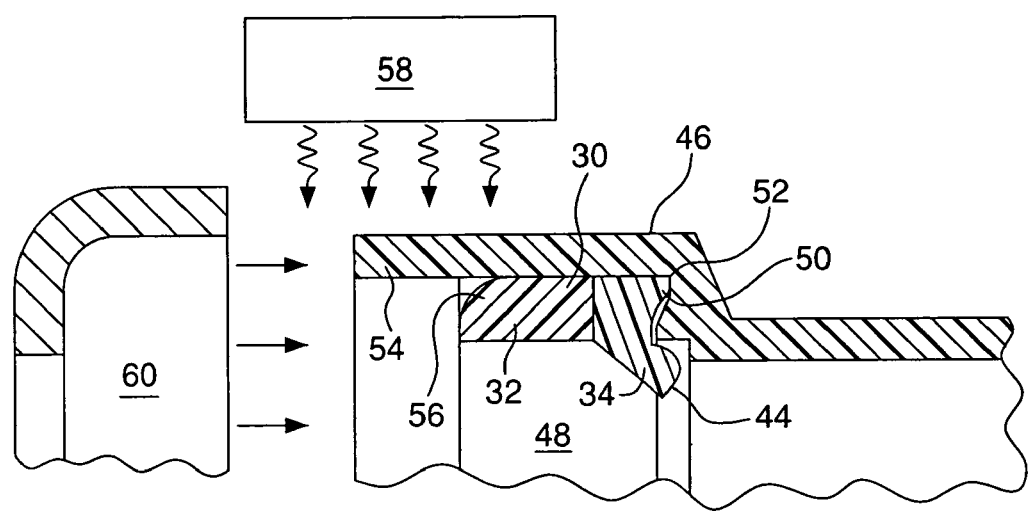
FIG. 3 is an elevational view in partial cross-section of a pipe fitting with a gasket according to a first embodiment of the present invention in which the pipe fitting is heated in preparation to be bent radially inwardly against the gasket.

FIG. 3 shows in partial schematic, the method of the present invention in which dual functional composite gasket 30 of FIG. 2, is used as a mold surface to form the bent retainer of hub 46. Thus, initially, gasket 30 is inserted into groove 48 of hub 46 such that the rounded corner 50 of the elastomeric portion 34 of gasket 30 mates with the corresponding sharp. corner 52 of groove 48 to securely position gasket 30 firmly in place during bending of retainer wall 54 of hub 46. Corner 52 has an angular cross-section which is preferably 90° or less and most preferably has an acute, sharp, angular corner of less than 90°. Since non-elastomeric portion 32 is substantially non-flexible in an axial direction, rounded edge 56 of the non-elastomeric portion 32 of gasket 30 serves as a molding surface for forming a retainer in the bell portion of the hub 46 to provide a precise and consistent retainer configuration.

Figure 4:
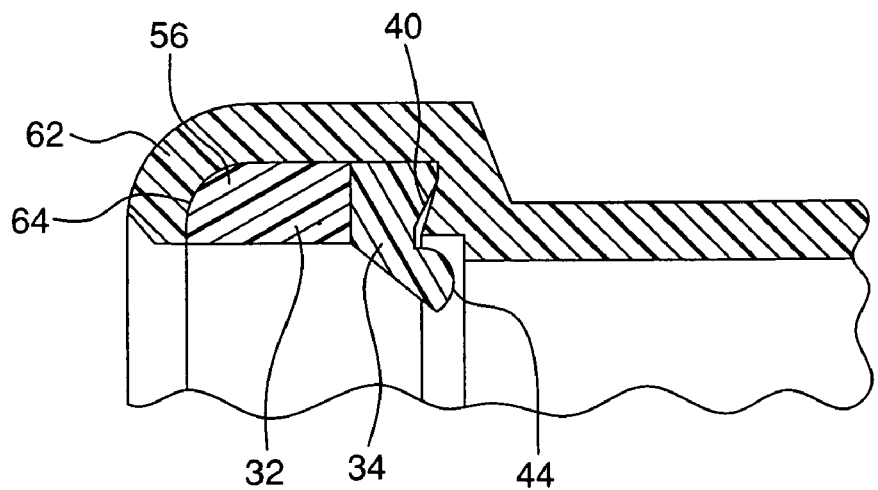
FIG. 4 is an elevational view in cross-section of the pipe fitting with the gasket of FIG. 3 after the pipe has been bent radially inwardly against the gasket.

As depicted in FIG. 3, heater 58, which may be a radiant heater, such as a filament heater, infrared heater or the like conventional heating element to soften plastic pipe, such as poly(vinylchloride) pipe, is employed to soften the outer edge 54 of hub 46 so that when metal die 60 is brought into contact with outer edge 54 of hub 46, the now softened outer edge 54 is caused to bend radially inwardly against curved surface 56 of the non-elastomeric portion 32, which serves as a forming mold for bent retainer 62 as seen in FIG. 4.

Referring to FIG. 4, it is seen that there is substantial contact between the inner curved surface 56 of the non-elastomeric portion of gasket 30 and the now cooled and solidified inner curved surface 64 of bent retainer 62, resulting in substantially no gap, i.e., the area of contact is substantially gap-free. Use of the continuous, circular non-elastomeric portion 32 as a mold surface for forming bent retainer 62 assures that bent retainer 62 will be uniform in appearance and dimensions unlike the gasketed fitting of FIG. 1 in which the shape of bent retainer is solely determined by the steel bending die, since there is no non-elastomeric plastic mold against which the retainer can be molded in a uniform manner. The resilient, elastomeric gasket 10 in FIG. 1 cannot provide a molding surface that will give uniform dimensions and consistency of shape to the bent retainer from fitting to fitting.

Thus, the composite gasket 30 of the present invention is "dual-functional", since the non-elastomeric portion serves as a mold for the heated edge of the hub to be bent and formed into a uniform bent retainer, as well as a sealing means for a joint formed when a length of pipe is inserted into gasketed hub of the pipe or fitting.

Figure 5:
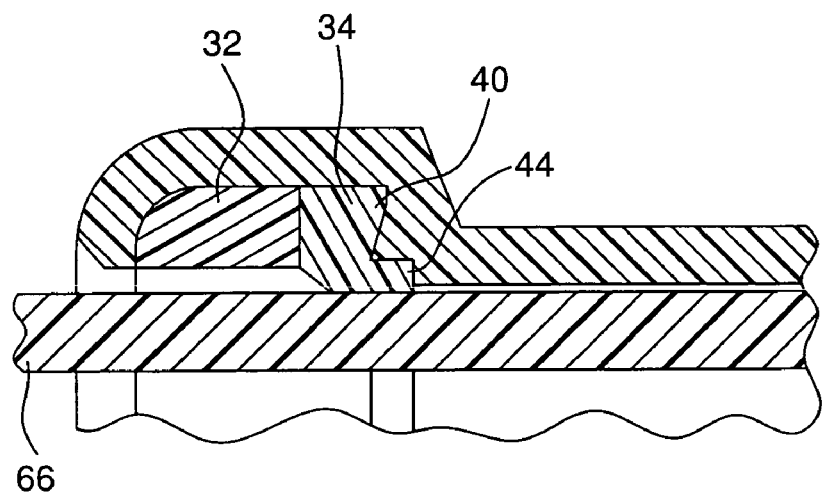
FIG. 5 is an elevational view in cross-section of the pipe joint in which a pipe has been inserted into the gasketed fitting of FIG. 4.

In FIG. 5, the spigot end of a pipe 66 has been inserted into gasketed hub 30 so as to engage elastomeric sealing lip 44 and form a pipe joint. The elastomeric gasket portion 34 is firmly seated in the groove to tightly seal the spigot end of adjacent pipe section 36 so as to provide a leak-proof junction when the system is pressurized.

In accordance with the preferred embodiments of the present invention, the molding portion of the composite gasket comprises the non-elastomeric, substantially non-flexible plastic and forms the major portion of the composite gasket, while the elastomeric portion of the composite gasket constitutes the minor portion of the gasket. By increasing the amount of non-elastomeric plastic in the composite gasket relative to the elastomeric portion, the rigidity of the mold portion of the gasket is increased, while the cost of the gasket is decreased proportionately, in view of the greater cost of the elastomeric portion of the gasket.

Figure 6:
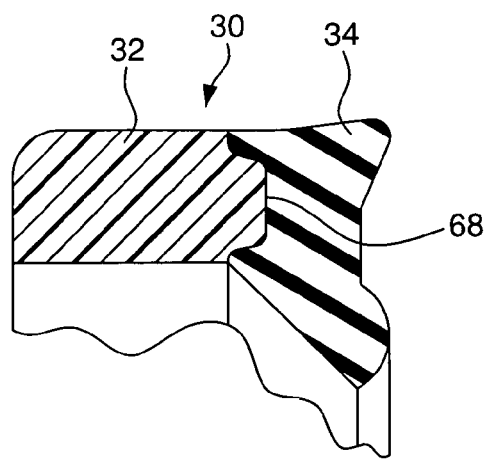
FIG. 6 is an elevational view in cross-section of a gasket according to a preferred embodiment of the present invention.
Figure 7:
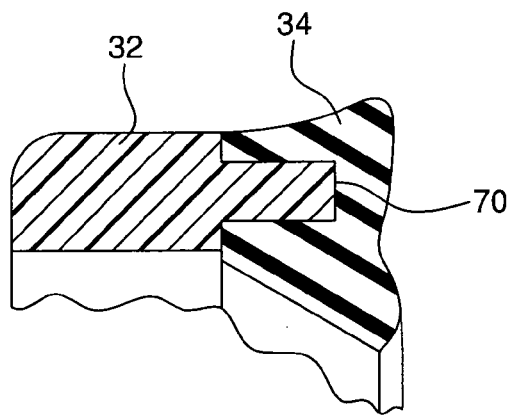
FIG. 7 is an elevational view in cross-section of a gasket according to another preferred embodiment of the present invention.
Figure 8:
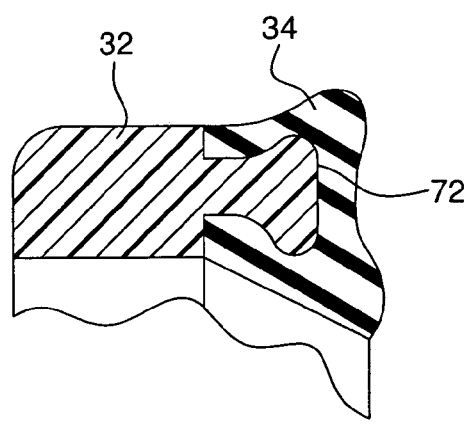
FIG. 8 is an elevational view in cross-section of a gasket according to a further preferred embodiment of the present invention.

As shown in FIGS. 6–8, the trailing edge of the non-elastomeric plastic portion 32 that abuts the elastomeric portion of the composite gasket 30 extends into the elastomeric portion of the gasket in various configurations. These configurations increase the amount of non-elastomeric plastic in the total composite gasket relative to the elastomeric portion and improve joining of the elastomeric and non-elastomeric portions of the composite gasket by increasing the surface of contact between elastomeric and non-elastomeric portions. Thus, in FIG. 6, the non-elastomeric plastic portion 32 of the composite gasket extends into and penetrates the elastomeric portion 34 of the composite gasket 30 in a generally shallow, semi-rectangular cross-sectional configuration 68 surrounded by a relatively small portion of the cross-sectional area of the elastomeric portion of the gasket. This configuration improves the joining of the non-elastomeric and elastomeric portions of the gasket, in addition to providing added rigidity to the gasket in its performance as a molding surface for the bent retainer and reducing the cost of the gasket.

In the embodiment of FIG. 7, the non-elastomeric plastic portion 32 of the composite gasket 30 extends into the elastomeric portion of the composite gasket 34 such that the extension 70 has a relatively elongated, semi-rectangular cross-sectional configuration and is surrounded by a relatively large portion of the cross-sectional area of the elastomeric portion 32 of the composite gasket. Likewise, this configuration improves the joining of the non-elastomeric plastic portion 32 to the elastomeric portion 34 of the gasket, as well as providing the improved rigidity and cost advantages.

The embodiment of FIG. 8 shows the extension of the non-elastomeric portion 32 as having a generally semi-dumbbell-like cross-sectional extension 72 of the non-elastomeric portion 32 of the gasket. This non-elastomeric extension significantly increases the area of contact between the non-elastomeric and elastomeric portions of the gasket and mechanically interlocks the non-elastomeric and elastomeric portions of the gasket together, while even further decreasing the cost of the gasket.

While advantageous embodiments have been chosen to illustrate the invention, it will be understood by those skilled in the art that various changes and modifications can be made therein without departing from the scope of the invention as defined in the appended claims.

What is claimed is:

1. A gasketed bell in the cylindrical body of a pipe or fitting, the pipe or fitting having a longitudinal axis and comprising
    an enlarged, generally cylindrical, one piece plastic hub formed in the forward end of said body, said hub having a cylindrical section of a first diameter suitable to overfit an end of an adjacent length of pipe,
    said hub including an integral, radially inward open, internal groove of a second diameter, said second diameter being greater than said first diameter,
    said internal groove being defined forwardly by an integral, radially inward bent retainer at the open end of said hub where the end of said adjacent length of pipe is to be inserted,
    said internal groove being defined rearwardly by an integral, circular, generally angular corner,
    said internal groove having a generally cylindrical, dual-functional, composite gasket disposed therein,
    said composite gasket comprising forward and rearward axially disposed portions, said forward, axially disposed portion being formed of a non-elastomeric, substantially rigid plastic and being substantially non-flexible in the axial direction, and having a first leading edge and a first trailing edge, said first leading edge of said forward axially disposed portion being in substantial contact with the inner surface of said radially inwardly bent retainer, said non-elastomeric, substantially rigid plastic being incapable of rapidly returning to its original length after being significantly stretched, said forward axially disposed portion having a substantially cylindrical radially outward surface radially spaced from the longitudinal axis of the gasket by a substantially constant distance from substantially said first leading edge to substantially said first trailing edge, said forward axially disposed portion comprising the major portion by volume of said gasket,
    said rearward axially disposed portion being formed of an elastomeric material and being adjacent and in contact with and fixedly attached to said forward axially disposed portion, said rearward axially disposed portion comprising a minor portion by volume of said gasket,
    said rearward axially disposed portion having a second leading edge and a second trailing edge, said second leading edge of said second axially disposed portion being in contact with said first trailing edge of said forward axially disposed portion, said second trailing edge having a rounded corner seated in said integral, circular, angular corner of said internal groove, said circular generally angular corner having a cross-section of 90° or less.

2. The gasketed bell of claim 1, wherein said bent retainer is formed by heating and bending the retainer radially inward until the inner surface of the bent retainer is in direct contact with the outer surface of said non-elastomeric plastic portion of said composite gasket, said non-elastomeric plastic portion being a mold for forming said bent retainer.

3. The gasketed bell of claim 1, wherein said forward axially disposed non-elastomeric major portion comprises from about 51 percent by volume to about 80 percent by volume of said composite gasket and said rearward axially disposed elastomeric portion comprises a minor portion of said composite gasket.

4. The gasketed bell of claim 3, wherein said first trailing edge forms an extension of said non-elastomeric portion into said rearward axially disposed elastomeric portion of said composite gasket.

5. The gasketed bell of claim 4, wherein said extension has a generally axially extending, semi-rectangular cross section surrounded by said elastomeric portion of said composite gasket.

6. The gasketed bell of claim 1, wherein said second trailing edge forms a radially extending elastomeric sealing lip and an adjacent rounded corner, said rounded corner seated in said integral, circular, sharp angular corner of said groove, said composite gasket having no additional plastic retaining ring.

7. The gasketed bell of claim 1, wherein said forward axially disposed portion and said rearward axially disposed portion are fused together at said first trailing edge and second leading edge, and said circular, generally angular corner is axially spaced from said bent retainer by a generally cylindrical base of said internal groove.

8. The gasketed bell of claim 1, wherein said integral, circular, angular corner of said groove has an angle less than 90°.

9. The gasketed bell of claim 1, wherein said non-elastomeric, substantially non-flexible plastic is tinted by a color tint to match the color of said gasketed bell.

10. The gasketed bell of claim 9, wherein said color is red, green, yellow, blue or brown, or a hue of such color.

11. The gasketed bell of claim 1, wherein said forward axially disposed portion is substantially flexible in a radial direction.

12. The gasketed bell of claim 1, wherein said forward axially disposed portion is substantially non-flexible in a radial direction.

13. The gasketed bell of claim 1, wherein said non-elastomeric plastic is a polyolefin.

14. The gasketed bell of claim 13, wherein said elastomeric material is a natural or synthetic rubber.

15. The gasketed bell of claim 1, wherein said composite gasket consists of said forward axially disposed portion and said rearward axially disposed portion.

16. The gasketed bell of claim 1, wherein said forward, axially disposed portion is formed of a non-elastomeric, substantially rigid plastic selected from the group consisting of polyethylene, polypropylene, copolymers of polyethylene and polypropylene, and poly(vinyl chloride).

17. A method for seating a composite gasket in the cylindrical body of a pipe or fitting, the pipe or fitting having a longitudinal axis, which method is conducted in the following sequence, order:
   a) providing an enlarged, generally cylindrical, one piece plastic hub formed in the forward end of said body, said hub having a cylindrical section of a first diameter suitable to overfit an end of an adjacent length of pipe, said hub including an integral, radially inward open, preformed internal groove of a second diameter, said second diameter being greater than said first diameter, said internal groove being defined rearwardly by an integral, circular, angular corner, said integral, circular, angular corner of said internal groove having an angle of 90° or less,
   b) inserting a generally cylindrical, dual-functional composite gasket into said groove, said gasket comprising forward and rearward axially disposed portions, said forward, axially disposed portion being formed of a non-elastomeric, substantially rigid plastic and being substantially non-flexible in the axial direction, and having a first leading edge and a first trailing edge, said non-elastomeric plastic being incapable of rapidly returning to its original length after being significantly stretched, said forward axially disposed portion having a substantially cylindrical radially outward surface radially spaced from the longitudinal axis of the gasket by a substantially constant distance from substantially said first leading edge to substantially said first trailing edge,
   said rearward axially disposed portion being formed of an elastomeric material,
   said rearward axially disposed portion having a second leading edge and a second trailing edge, said second leading edge of said second axially disposed portion being in contact with said first trailing edge of said forward axially disposed portion, said second trailing edge having a rounded corner, said gasket being inserted into said groove such that said rounded corner is seated in said integral, circular, angular corner of said groove and said forwardly axially disposed portion of said gasket is facing axially toward the open end of said hub, and
   c) heating the outer edge of an end portion of said second diameter section of said hub and bending said heated end portion so as to cause said heated end portion to bend radially inward until the inner surface of said heated end is in substantial contact with said first leading edge of said non-elastomeric, substantially non-flexible plastic portion of said composite gasket which portion serves as a mold for said heated end portion, so as to provide said hub with a bent retainer in which there is substantially no gap between said inner surface of said heated end portion and said first leading edge of said non-elastomeric, substantially non-flexible plastic portion of said composite gasket.

18. The method of claim 17, wherein said non-elastomeric portion comprises a major portion by volume of said composite gasket and said elastomeric portion comprises a minor portion by volume of said composite gasket.

19. The method of claim 18, wherein said first trailing edge forms an extension of said non-elastomeric portion into said rearward axially disposed elastomeric portion of said composite gasket.

20. The method of claim 19, wherein said extension has a generally axially extending, semi-rectangular cross section surrounded by said elastomeric portion of said composite gasket.

21. The method of claim 18, wherein said forward axially disposed non-elastomeric portion is from about 51 percent by volume to about 80 percent by volume of said composite gasket and said rearward axially disposed elastomeric portion comprises the remainder of said composite gasket.

22. The method of claim 21, wherein said forward axially disposed non-elastomeric portion comprises from about 52 percent by volume to about 70 percent by volume of said composite gasket.

23. The method of claim 17, wherein said second trailing edge forms a radially extending elastomeric sealing lip and an adjacent rounded corner, said rounded corner seated in said integral, circular, sharp angular corner of said groove.

24. The method of claim 17, wherein said forward axially disposed portion and said rearward axially disposed portion are fused together at said first trailing edge and second leading edge.

25. The method of claim 17, wherein said integral, circular, angular corner of said groove has an angle of 90° or less, said composite gasket having no additional plastic retaining ring.

26. The method of claim 17, wherein said forward axially disposed portion is substantially flexible in a radial direction.

27. The method of claim 17, wherein said forward axially disposed portion is substantially non-flexible in a radial direction.

28. The method of claim 17, wherein said non-elastomeric plastic is a polyolefin.

29. The method of claim 28, wherein said elastomeric material is a natural or synthetic rubber.

30. The method of claim 17, wherein said composite gasket consists of said forward axially disposed portion and said rearward axially disposed portion.

31. The method of claim 17, wherein said forward, axially disposed portion is formed of a non-elastomeric, substantially rigid plastic selected from the group consisting of polyethylene, polypropylene, copolymers of polyethylene and polypropylene, and poly(vinyl chloride).

32. A dual-functional, generally cylindrical, composite gasket for forming a seal between a pipe or fitting bell and a spigot comprising:
   a first axially disposed portion formed of a non-elastomeric, substantially rigid plastic and having a first leading edge and a first trailing edge, said non-elastomeric substantially rigid plastic being incapable of rapidly returning to its original length after being significantly stretched, said first axially disposed portion having a substantially cylindrical radially outward surface radially spaced from the longitudinal axis of the gasket by a substantially constant distance from substantially said first leading edge to substantially said first trailing edge,
   a second axially disposed portion formed of an elastomeric material, having a second leading edge and a second trailing edge, said first trailing edge of said first portion being in substantial contact and fixedly attached to the second leading edge of said second portion, said first and second axially disposed portions having substantially the same outer diameter at and proximal to the point of contact between said first trailing edge and said second leading edge to form a continuous outer surface therebetween,
   said first axially disposed portion being substantially non-flexible in the axial direction and comprising a major portion by volume of said dual-functional composite gasket and said second axially disposed portion comprising a minor portion by volume of said dual-functional composite gasket,
   said second trailing edge forming a radially extending elastomeric sealing lip and an adjacent rounded corner,
   said gasket being adapted for insertion into a groove of said bell such that said first axially disposed portion of said gasket receives said spigot prior to said second axially disposed portion of said gasket when said spigot is inserted into said bell.

33. The dual-functional composite gasket of claim 32, wherein said first trailing edge forms an extension of said first axially disposed portion into said rearward axially disposed portion of said composite gasket.

34. The dual-functional composite gasket of claim 33, wherein said extension has a generally axially extending, semi-rectangular cross section surrounded by said second axially disposed portion of said composite gasket.

35. The dual-functional composite gasket of claim 33, wherein said extension has a generally axially extending semi-dumbbell-shaped cross-section surrounded by said second axially disposed portion of said composite gasket.

36. The dual-functional composite gasket of claim 32, wherein said non-elastomeric plastic first axially disposed major portion comprises between about 52 and about 70 percent by volume of said composite gasket, said composite gasket having no additional plastic retaining ring.

37. The dual-functional composite gasket of claim 36, wherein said first axially disposed portion comprises about 60 percent by volume of said gasket.

38. The dual-functional composite gasket of claim 32, wherein said non-elastomeric plastic is tinted with a colored tint.

39. The dual-functional composite gasket of claim 38, wherein said colored tint renders the non-elastomeric portion red, green, yellow, blue or brown, or a hue of such color.

40. The dual-functional composite gasket of claim 32, wherein said elastomeric material is tinted with a colored tint.

41. The dual functional gasket of claim 32, wherein said first axially disposed portion is substantially flexible in a radial direction.

42. The dual functional gasket of claim 32, wherein said first axially disposed portion is substantially non-flexible in a radial direction.

43. The gasket of claim 32, wherein said non-elastomeric plastic is a polyolefin.

44. The gasketed bell of claim 43, wherein said elastomeric material is a natural or synthetic rubber.

45. The gasket of claim 32, wherein said composite gasket consists of said forward axially disposed portion and said rearward axially disposed portion.

46. The gasket of claim 32, wherein said forward, axially disposed portion is formed of a non-elastomeric, substantially rigid plastic selected from the group consisting of polyethylene, polypropylene, copolymers of polyethylene and polypropylene, and poly(vinyl chloride).

47. A pipe joint formed by inserting the insert end of a first plastic pipe into the gasketed plastic bell in the cylindrical body of a pipe or fitting having a longitudinal axis and comprising
   an enlarged, generally cylindrical, one piece plastic hub formed in the forward end of said body, said hub having a cylindrical section of a first diameter suitable to overfit said insert end of said plastic pipe,
   said hub including an integral, radially inward open, internal groove of a second diameter, said second diameter being greater than said first diameter,
   said internal groove being defined forwardly by an integral, radially inward bent retainer at the open end of said hub where the end of said adjacent length of pipe is to be inserted,
   said internal groove being defined rearwardly by an integral, circular, generally angular corner,
   said internal groove having a generally cylindrical, dual-functional, composite gasket disposed therein,
   said composite gasket comprising forward and rearward axially disposed portions, said forward, axially disposed portion being formed of a non-elastomeric, substantially rigid plastic and being substantially non-flexible in an axial direction, and having a first leading edge and a first trailing edge, said first leading edge of said forward axially disposed portion being in substantial contact with the inner surface of said radially inwardly bent retainer, said forward axially disposed portion having a substantially cylindrical radially outward surface radially spaced from the longitudinal axis of the gasket by a substantially constant distance from substantially said first leading edge to substantially said first trailing edge, said rearward axially disposed portion being formed of an elastomeric material and being adjacent and in contact and fixedly attached to said forward axially disposed portion, said non-elastomeric portion comprises a major portion of said gasket in the range of up to about 80 percent by volume of said composite gasket, said rearward axially disposed portion having a second leading edge and a second trailing edge, said second leading edge of said second axially disposed portion being in contact with said first trailing edge of said forward axially disposed portion, said second trailing edge having a rounded corner seated in said integral, circular, angular corner having a cross-section of 90° or less, said circular, generally angular corner axially spaced from said bent retainer by a cylindrical base of said internal groove, said bent retainer and said hub being of unitary construction, the outer surface of said first plastic pipe being spaced apart from the inner surface of said forward axially disposed portion and being in contact with the outer surface of said second trailing edge when said plastic pipe has been inserted into said gasketed plastic bell.

48. The pipe joint of claim 47, wherein said non-elastomeric plastic is a polyolefin.

49. The gasketed bell of claim 48, wherein said elastomeric material is a natural or synthetic rubber.

50. The pipe joint of claim 47, wherein said composite gasket consists of said forward axially disposed portion and said rearward axially disposed portion.

51. A gasketed bell in the cylindrical body of a pipe or fitting, the pipe or fitting having a longitudinal axis and comprising an enlarged, generally cylindrical, one piece plastic hub formed in the forward end of said body, said hub having a cylindrical section of a first diameter suitable to overfit an end of an adjacent length of pipe, said hub including an integral, radially inward open, internal groove of a second diameter, said second diameter being greater than said first diameter, said internal groove being defined forwardly by an integral, radially inwardly extending retainer at the open end of said hub where the end of said adjacent length of pipe is to be inserted, said internal groove being defined rearwardly by an integral, circular, generally angular corner, said internal groove having a generally cylindrical, dual-functional, composite gasket disposed therein, said composite gasket consists of forward and rearward axially disposed portions, said forward, axially disposed portion being formed of a non-elastomeric, substantially rigid plastic, and being substantially non-flexible in the axial direction, and having a first leading edge and a first trailing edge, said first leading edge of said forward axially disposed portion being in substantial contact with the inner surface of said radially inwardly extending retainer, said forward axially disposed portion having a substantially cylindrical radially outward surface radially spaced from the longitudinal axis of the gasket by a substantially constant distance from substantially said first leading edge to substantially said first trailing edge, said rearward axially disposed portion being formed of an elastomeric material, and being adjacent and in contact with said forward axially disposed portion, said forward axially disposed portion being fixedly attached to said rearward axially disposed portion by fusion or adhesion to form a unitary gasket, said non-elastomeric plastic being incapable of rapidly returning to its original length after being significantly stretched, said rearward axially disposed portion having a second leading edge and a second trailing edge, said second leading edge of said second axially disposed portion being in contact with said first trailing edge of said forward axially disposed portion, said second trailing edge having a rounded corner seated in said integral, circular, angular corner having a cross-section of 90° or less, said circular, generally angular corner axially spaced from said bent retainer by a cylindrical base of said internal groove.

52. The gasketed bell of claim 51, wherein said non-elastomeric portion comprises a major portion of said composite gasket and said elastomeric portion comprises a minor portion of said composite gasket.

53. The gasketed bell of claim 52, wherein said first trailing edge forms a generally axial extension of said first axially disposed portion into said rearward axially disposed portion of said gasket.

54. The gasketed bell of claim 51, wherein said forward axially disposed portion is substantially flexible in a radial direction.

* * * * *